United States Patent [19]

Sakamoto

[11] Patent Number: 4,985,326

[45] Date of Patent: Jan. 15, 1991

[54] ELECTROPHOTOGRAPHIC PHOTORECEPTOR

[75] Inventor: Shuji Sakamoto, Chiba, Japan

[73] Assignee: Idemitsu Kosan Co., Ltd., Tokyo, Japan

[21] Appl. No.: 385,468

[22] Filed: Jul. 27, 1989

[51] Int. Cl.$^5$ .............................................. G03G 5/04
[52] U.S. Cl. ..................................................... 430/96
[58] Field of Search ............................. 430/59, 69, 129

[56] References Cited

U.S. PATENT DOCUMENTS 4,637,971  1/1987  Takei et al. ............................ 430/96
4,772,526  9/1988  Kan et al. ............................... 430/96

Primary Examiner—John Goodrow
Attorney, Agent, or Firm—Antonelli, Terry, Stout & Kraus

[57] ABSTRACT

An electrophotographic photoreceptor comprising an electroconductive layer and a photosensitive layer disposed on one surface of the electroconductive substrate, the photosensitive layer containing a specific polycarbonate or polycarbonate copolymer used as a binder-resin, has such advantageous characteristics that it can be produced by using an application method without accompanying with whitening (gelation) of the coating liquid used for forming the photosensitive layer nor inviting occurrence of solvent-cracks in the formed photosensitive layer.

In addition, it excels in mechanical strength and the characteristics required in electrophotography which can be maintained even if it is repeatedly used over long periods.

17 Claims, No Drawings

ELECTROPHOTOGRAPHIC PHOTORECEPTOR

BACKGROUND OF THE INVENTION (a) Industrial Field of the Invention

The present invention relates to an electrophotographic photoreceptor. More specifically, the present invention relates to an electrophotographic photoreceptor which due to its ability of maintaining its superior mechanical strength and outstanding electrophotographic properties, i.e., characteristics required in electrophotography, over a long period, can be suitably utilized in a variety of application fields of electrophotography.

(b) Description of the Related Art

In recent fields of electrophotography, the main current of photoreceptors has been layered-type of organic electrophotographic photoreceptors of which the photosensitive layer contains at least two elementary layers, a charge generation layer where charges are generated by exposure and a charge transport layer where transport of the potential occurs. In this sort of layered-type organic photoreceptors, a binder-resin is used as a component of its charge transport layer and a polycarbonate resin obtained by using bisphenol-A as a starting monomer has been widely used as the binder-resin.

Polycarbonate resins made from bisphenol-A generally have such advantageous characteristics that because of their good compatibility with charge transporting materials, they render the resulting photoreceptors good electrical properties and high mechanical strength.

However, it has been found that problems, including the following problems (1)–(3), arise in the case that the charge transport layer of a photoreceptor is formed by using a polycarbonate resin made from bisphenol-A as the binder-resin.

(1) In preparation of a photoreceptor, whitening (gelatin) of a coating solution applied for forming the charge transport layer tends to occur depending on the kind of the solvent used for preparing the coating solution to be applied, and the formed charge transport layer tends to crystallize easily. This crystallization causes quality defects of the developed image since photo-induced discharge hardly occurs on the crystallized regions of the charge transport layer, leaving the residual charges which cause an undesirable electric potential on the regions.

(2) Solvent-crack of the polycarbonate resin derived from bisphenol-A is often caused in the charge transport layer by another solvent used for applying another layer onto the charge transport layer. In other words, exposing the once prepared charge transport layer with another solvent greatly decreases the mechanical strength of the charge transport layer. If the resulting photoreceptor is used by rotating for long time in a copying machine, the charge transport layer will get cracked causing the appearance of some crack-patterns on the resulting copied articles.

(3) A charge transport layer formed by using a polycarbonate resin made from bisphenol-A as its binder-resin tends to be peeled off from the base layer because of its poor adhesion to the base layer. Consequently, the resulting photoreceptor often meets such a disadvantage that its life in practical use for copying is short. The base layer described above usually indicates a charge generation layer. However, it may indicate an electric conductor in the case of a positively-charged-type electrophotographic photoreceptor where a charge transport layer and a charge generation layer are successively laminated on an electric conductor in that order, or it may be an intermediate layer (such as a blocking layer, etc.) in the case that the intermediate layer is formed between an electric conductor and a charge transport layer or between a charge generation layer and a charge transport layer with aiming at improving electrophotographic properties.

SUMMARY OF THE INVENTION

The present invention has been performed in view of the above described situation, particularly in pursuit of means to remove the above described problems that may be found in the conventional electrophotographic photoreceptors prepared by using a polycarbonate resin made from bisphenol A as a binder-resin.

It is accordingly an object of the present invention to provide an electrophotographic photoreceptor which can be prepared without accompanying whitening of coating solutions comprising binder-resins nor solvent-crack of the layer formed, and maintains a superior mechanical strength and outstanding electrophotographic properties for a long period in practical use.

As the result of our researches, we have found that use of a polycarbonate resin having a specific structure as a binder-resin in the photosensitive layer, especially the charge transport layer in the photosensitive layer, of an electrophotographic photoreceptor makes the resulting photoreceptor free from the whitening (gelation) of coating solutions or solvent-crack in preparation of the photoreceptor, which may be found in the conventional electrophotographic photoreceptors prepared by using a polycarbonate resin made from bisphenol-A as a binder-resin, and as well, enables the resulting photoreceptor to maintain its superior mechanical strength and outstanding electrophotographic properties over a long period in practical use.

On the basis of the above described findings, we have completed the present invention.

Accordingly, the present invention provides an electrophotographic photoreceptor comprising an electroconductive substrate and a photosensitive layer disposed on one surface of said electroconductive substrate, wherein said photosensitive layer contains a binder-resin comprising (A) a polycarbonate having the repeating unit represented by the following general formula (I):

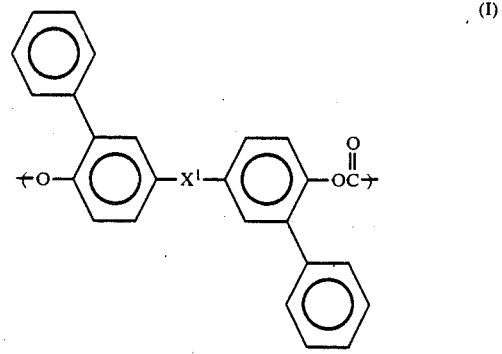

wherein
X¹ in the formula [I] is

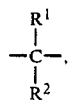

$R^1$ and $R^2$ each independently being hydrogen atom, an alkyl group having a carbon number of 1 to 6 or an aryl group having a carbon number of 6 to 12,

in being an integer of 4 to 10, —$(CH_2)_p$—
p being an integer of 2 to 10, a single bond, —O—, —S—, —SO—, or —SO$_2$—;
or (B) a polycarbonate copolymer comprising both the repeating unit represented by the general formula (1) and the repeating unit represented by the following general formula (II):

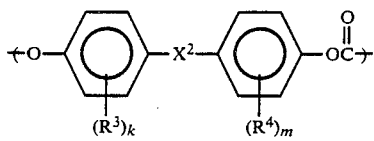

wherein
$R^3$ and $R^4$ in the general formula (II) each are independently a halogen atom, an alkyl group having a carbon number of 1 to 6 or cyclohexyl group;
k and m are each independently an integer of 0 to 4; and the definition of $X^2$ is the same as the definition of $X^1$ in the general formula (I) as described above, with the proviso that $X^1$ and $X^2$ are identical with or different from each other.

DESCRIPTION OF THE PREFERRED EMBODIMENTS

Some illustrative examples of $R^1$ and $R^2$ in the

described above include hydrogen atom, methyl group, ethyl group, n-propyl group, isopropyl group, n-butyl group, 1-methylpropyl group, 2-methylpropyl group, tert-butyl group, n-pentyl group, isopentyl group, n-hexyl group, isohexyl group, phenyl group, tolyl group, xylyl group, trimethylphenyl group, ethylphenyl group, naphthyl group, methylnaphthyl group, and biphenylyl group. Among them, the especially preferred are methyl group, and phenyl group. Where, $R^1$ and $R^2$ may be identical with or different from each other.

Examples of the especially preferred groups among the

groups include

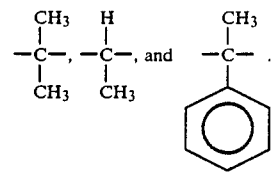

Some illustrative examples of the

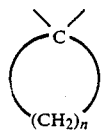

group described above include 1,1-cyclopentylidene group, 1,1-cyclohexylidene group, and 1,1-cyclooctylidene group. Among them, the especially preferred examples include 1,1-cyclohexylidene group.

Some illustrative examples of the —$(CH_2)_p$— group include methylene group, dimethylene group, trimethylene group, tetramethylene group, hexamethylene group, octamethylene group, and decamethylene group. Among them, the especially preferred examples include dimethylene group.

Some illustrative examples of $R^3$ and $R^4$ include a halogen atom, such as fluorine atom, chlorine atom, and bromine atom, methyl group, ethyl group, n-propyl group, isopropyl group, n-butyl group, 1-methylpropyl group, 2-methylpropyl group, tert-butyl group, n-pentyl group, isopentyl group, neopentyl group, n-hexyl group, and isohexyl group. Where, $R^3$ and $R^4$ may be identical with or different from each other. In addition, in the case that the repeating unit represented by the formula (II) has two or more $R^3$ groups, they can be the same or different from one another, and if it has two or more $R^4$ groups, they can be the same or different from one another.

The above-described k and m each independently are an integer of 0 to 4, and the especially preferred example is k=m=0.

The polycarbonate (A) having the repeating unit represented by the general formula (I) can be prepared, for example, by the condensation polymerization of one or more kinds of dihydric phenols represented by the following general formula:

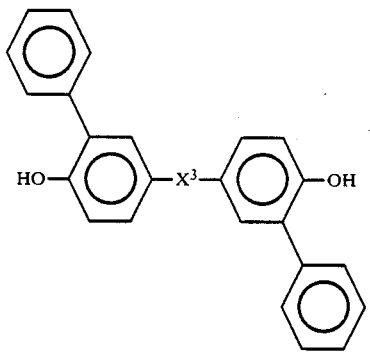
(I')

wherein $X^1$ is as defined above in the formula (I); with a carbonate precursor, such as phosgene, etc., in a proper neutral polar solvent in the presence of a proper acid acceptor.

Polycarbonate (A) can also be prepared by transesterification of a bisaryl carbonate with a dihydric phenol (I').

On the other hand, the polycarbonate copolymer (B) comprising the repeating unit represented by the general formula (I) and the repeating unit represented by the general formula (II) can be prepared by condensation polymerization of one or more kinds of the dihydric phenols (I') described above and one or more kinds of dihydric phenols represented by the following general formula:

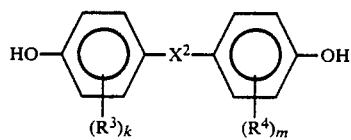
(II')

wherein $X^2$, $R^3$, $R^4$, k, and m in the formula (II') are as defined above;
with a carbonate precursor, such as phosgene, etc., in a proper neutral polar solvent in the presence of a proper acid acceptor.

Polycarbonate copolymer (B) can also be prepared by the transesterification of a bisaryl carbonate with a mixture of a dihydric phenol (I') and a dihydric phenol (II').

Some illustrative examples of the dihydric phenol (I') described above include
2,2-bis(3-phenyl-4-hydroxyphenyl)propane,
1-phenyl-1,1-bis(3-phenyl-4-hydroxyphenyl)ethane,
1,1-bis(3-phenyl-4-hydroxyphenyl)cyclohexane,
3,3-bis(3-phenyl-4-hydroxyphenyl)pentane,
bis(3-phenyl-4-hydroxyphenyl)sulfone,
3,3'-diphenyl-4,4'-dihydroxybiphenyl,
bis(3-phenyl-4-hydroxyphenyl)methane,
1-phenyl-1,1-bis(3-phenyl-4-hydroxyphenyl)methane,
1,1-bis(3-phenyl-4-hydroxyphenyl)ethane,
1,2-bis(3-phenyl-4-hydroxyphenyl)ethane,
1,3-bis(3-phenyl-4-hydroxyphenyl)propane,
2,2-bis(3-phenyl-4-hydroxyphenyl)butane,
1,4-bis(3-phenyl-4-hydroxyphenyl)butane,
1,1-bis(3-phenyl-4-hydroxyphenyl)-1-phenylbutane,
2,2-bis(3-phenyl-4-hydroxyphenyl)octane,
1,8-bis(3-phenyl-4-hydroxyphenyl)octane,
bis(3-phenyl-4-hydroxyphenyl)ether,
bis(3-phenyl-4-hydroxyphenyl)sulfide, and
1,1-bis(3-phenyl-4-hydroxyphenyl)cyclopentane.

Among them, the especially preferred examples include
2,2-bis(3-phenyl-4-hydroxyphenyl)propane,
1-phenyl-1,1-bis(3-phenyl-4-hydroxyphenyl)ethane,
1,1-bis(3-phenyl-4-hydroxyphenyl)cyclohexane, and
bis(3-phenyl-4-hydroxyphenyl)sulfone.

Some illustrative examples of the dihydric phenol (II') described above include
bis(4-hydroxyphenyl)methane,
1,1-bis(4-hydroxyphenyl)ethane,
1,2-bis(4-hydroxyphenyl)ethane,
2,2-bis(4-hydroxyphenyl)propane,
2,2-bis(3-methyl-4-hydroxyphenyl)butane,
2,2-bis(4-hydroxyphenyl)butane,
2,2-bis(4-hydroxyphenyl)octane,
4,4-bis(4-hydroxyphenyl)heptane,
4,4'-dihydroxytetraphenylmethane,
1,1-bis(4-hydroxyphenyl)-1-phenylethane,
1,1-bis(4-hydroxyphenyl)-1-phenylmethane,
bis(4-hydroxyphenyl)ether,
bis(4-hydroxyphenyl)sulfide,
bis(4-hydroxyphenyl)sulfone,
1,1-bis(4-hydroxyphenyl)cyclopentane,
1,1-bis(4-hydroxyphenyl)cyclohexane,
2,2-bis(3-methyl-4-hydroxyphenyl)propane,
2-(3-methyl-4-hydroxyphenyl)-2-(4-hydroxyphenyl)-1-phenylethane,
bis(3-methyl-4-hydroxyphenyl)sulfide,
bis(3-methyl-4-hydroxyphenyl)sulfone,
bis(3-methyl-4-hydroxyphenyl)methane,
1,1-bis(3-methyl-4-hydroxyphenyl)cyclohexane,
4,4'-dihydroxybiphenyl,
2,2-bis(2-methyl-4-hydroxyphenyl)propane,
1,1-bis(2-butyl-4-hydroxy-5-methylphenyl)butane,
1,1-bis(2-tert-butyl-4-hydroxy-3-methylphenyl)ethane,
1,1-bis(2-tert-butyl-4-hydroxy-5-methylphenyl)propane,
1,1-bis(2-tert-butyl-4-hydroxy-5-methylphenyl)butane,
1,1-bis(2-tert-butyl-4-hydroxy-5-methylphenyl)isobutane,
1,1-bis(2-tert-butyl-4-hydroxy-5-methylphenyl)heptane,
1,1-bis(2-tert-butyl-4-hydroxy-5-methylphenyl)-1-phenylmethane,
1,1-bis(2-tert-amyl-4-hydroxy-5-methylphenyl)butane,
bis(3-chloro-4-hydroxyphenyl)methane,
bis(3,5-dibromo-4-hydroxyphenyl)methane,
2,2-bis(3-chloro-4-hydroxyphenyl)propane,
2,2-bis(3-fluoro-4-hydroxyphenyl)propane,
2,2-bis(3-bromo-4-hydroxyphenyl)propane,
2,2-bis(3,5-difluoro-4-hydroxyphenyl)propane,
2,2-bis(3,5-dichloro-4-hydroxyphenyl)propane,
2,2-bis(3,5-dibromo-4-hydroxyphenyl)propane,
2,2-bis(3-bromo-4-hydroxy-5-chlorophenyl)propane,
2,2-bis(3,5-dichloro-4-hydroxyphenyl)butane,
2,2-bis(3,5-dibromo-4-hydroxyphenyl)butane,
1,1-bis(3-fluoro-4-hydroxyphenyl)-1-phenylethane,
bis(3-fluoro-4-hydroxyphenyl)ether,
3,3'-difluoro-4,4'-dihydroxybiphenyl, and
1,1-bis(3-cyclohexyl-4-hydroxyphenyl)cyclohexane.

Among them, the especially preferred examples include 2,2-bis(4-hydroxyphenyl)propane.

The above-described acid acceptor can be selected from various kinds of acid acceptors including known ones. Examples of the acid acceptor which may be used include an alkaline metal hydroxide, such as sodium hydroxide and potassium hydroxide, and organic base, such as pyridine, and a mixture thereof.

Examples of the solvent which may be used include methylene chloride, chlorobenzene, and xylenes.

It is desirable to carry out the reaction in the presence of a catalyst and a molecular weight regulator in order to accelerate the condensation polymerization and to adjust the degree of polymerization.

Examples of the catalyst which may be used include a tertiary amine, such as triethyl amine and a quarternary ammonium salt.

Examples of the molecular weight regulator which may be used include p-t-butyl phenol and phenyl phenol.

A small amount of an antioxidant, such as sodium sulfite and sodium hydrosulfite, may be added to the polycarbonate or the polycarbonate copolymer used in the present invention, as occasion demands.

The reaction (i.e., the condensation polymerization) is conducted at a temperature in the range usually of 0° to 150° C., preferably of 5° to 40° C. The reaction is carried out usually for 0.5 min to 10 hr, preferably for 1 min to 2 hr, although the period of the reaction depends on the reaction temperature employed. In addition, it is desirable to keep the pH value of the reaction system at not less than 10 during the reaction.

On the other hand, if the transesterification described above is employed in the preparation of the polycarbonate or the polycarbonate copolymer, the above described dihydric phenol compound(s) and a bisaryl carbonate will be mixed, and allowed to react one another at an elevated temperature under a reduced pressure. This reaction is conducted at a temperature in the range usually of 150° to 350° C., preferably of 200° to 300° C. It is preferable to reduce the reaction pressure finally to not higher than 1 mmHg, so that the phenol(s) derived by the transesterification from the bisaryl carbonate can be removed out from the reaction system. The reaction (the transesterification) is carried out usually for about 1 to 4 hr, although the period of the reaction depends on the reaction conditions employed, including the reaction temperature and the degree of the reduction of the pressure, and the like. It is preferred that this reaction is conducted under an atmosphere of an inert gas, such as nitrogen, and argon. It is possible to carry out the reaction in the presence of additives, such as the molecular weight regulator, the antioxidant, etc., described above.

The polycarbonate (A) and the polycarbonate copolymer (B) which may be suitably used in the photosensitive layer of the electrophotographic photoreceptor of the present invention are those having a reduced viscosity $[\eta_{sp}/C]$ of usually not less than 0.25 dl/g, preferably 0.3 to 4.0 dl/g as measured in methylene chloride at a concentration of 0.5 g/dl at 20° C.

The polycarbonate (A) to be used in the present invention may be a homopolymer comprising a single kind of the repeating unit represented by the above described formula (I), or a copolymer comprising two or more kinds of (I) at any ratio. These polycarbonates (A) may be used individually or in an any ratio of combination of two or more kinds of them, such as in a form of a mixture thereof.

The polycarbonate copolymer (B) to be used in the present invention is a copolymer comprising one or more kinds of the repeating unit represented by the formula (I) and one or more kinds of the repeating unit represented by the formula (II). The ratio of the repeating units, (I) to (II), in the polycarbonate copolymer (B) is not necessarily specified in the present invention. However, it is suitable that the polycarbonate copolymer (II) has a content of the repeating unit (I) of not less than 1 mol %, preferably not less than 5 mol % based on the total content of the repeating units (I) and (II). These polycarbonate copolymers (B) may be used individually or in an any ratio of combination of two or more kinds of them, such as in a form of a mixture thereof.

In addition, it is also possible to use one or more kinds of the polycarbonates (A) together with one or more kinds of the polycarbonate copolymers (B) as a mixture thereof or the like.

Furthermore, the polycarbonate (A) and/or the polycarbonate copolymer (B) may also be used together with known binder-resins, including other known polycarbonates, and the like, with or without mixing them, as far as the object of the present invention is still sufficiently attained.

The preferred embodiment of the electrophotographic photoreceptor of the present invention comprises a photosensitive layer disposed on one surface of an electroconductive substrate, wherein the photosensitive layer is a laminated layer comprising a charge generation layer and a charge transport layer. The charge transport layer may be disposed on the charge generation layer with the charge generation layer sandwiched between the charge transport layer and the electroconductive substrate, or the charge generation layer may be disposed on the charge transport layer with the charge transport layer sandwiched between the charge generation layer and the electroconductive substrate. The electrophotographic photoreceptor of the present invention may further have an electroconductive or insulating protective film formed on its surface at need. Furthermore, it may have one or more intermediate layers, such as a blocking layer which is effective for blocking the recombination of the charges generated, or one or more adhesion layers for improving the adhesive force between the layers therein, or the like.

The electrophotographic photoreceptor of the present invention contains a binder-resin comprising at least the polycarbonate (A) or the polycarbonate copolymer (B), in the photosensitive layer, preferably in the charge transport layer of the photosensitive layer.

The electroconductive substrate to be used in the electrophotographic photoreceptor of the present invention may be selected from a various kinds of electroconductive substrates, including known ones and the like. Some illustrative examples of the electroconductive substrate which may be used in the present invention include a plate or sheet made of a metal, such as aluminum, brass, copper, nickel, steel, etc., a conductivity-introduced or conductive-layer-containing substrate obtained by giving a treatment for introducing electric conductivity or by laminating an electroconductive layer to a non or poor-conductive substrate, such as a glass plate, plastic sheet, cloth, paper, a blacksheet, etc.,; e.g., an electroconductive substrate prepared by depositing, spattering or applying a conductive material, such as aluminum, nickel, chromium, palladium or graphite, to the non or poor-conductive substrate described above.

The charge generation layer to be used in the present invention comprises at least a charge generating material. The charge generation layer in the electrophotographic photoreceptor of the present invention can be prepared by mixing and binding a charge genarating material with a binder-resin to form a layer on a base layer, such as the electroconductive layer. Various kinds of methods for forming a charge generation layer including known methods may be employed in the present invention. For instance, the charge generation layer may preferably be formed by applying a coating liquid obtained by dissolving or suspending a charge generating material together with a binder-resin in a suitable solvent onto a base layer, followed by drying.

The charge generating material which may be used in the charge generation layer can be selected from a various kinds of organic or inorganic charge generating materials, including known ones and the like. Examples of the charge generating material which may be used include a simple substance of selenium, such as non-crystalline selenium and crystalline selenium of a trigonal system, a selenium-based alloy, such as a selenium-tellurium alloy, a selenide, such as $As_2Se_3$, a selenium-containing composition, zinc oxide, an inorganic material comprising an element of the group II and that of the group IV in the periodic table, such as CdS-Se, and oxide semiconductor, such as titanium oxide, a silicon-based material, such as amorphous silicon, a phthalocyanine, a metal complex of a phthalocyanine, cyanine, anthracene, pyrene, perylene, a pyrylium salt, a thiapyrylium salt, polyvinyl carbazole, a squarelium pigment, and the like.

They may be used individually or in a combination of two or more kinds thereof, for example in a form of a mixture thereof.

The binder-resin which may be used in the charge generation layer is not especially specified in the present invention. This can be selected from a various kinds of binder-resins, including known ones. Examples of the binder-resin which may be used in the charge generation layer include thermoplastic resins, such as polystyrene, polyvinyl chloride, polyvinyl acetate, vinyl chloride-vinyl acetate copolymer, polyvinyl acetal, alkyd resins, acrylic resins, polyacrylonitrile, polycarbonates, polyamides, polyketones, polyacrylamides, polybutyral resins, and polyesters, thermosetting resins, such as polyurethanes, epoxy resins, and phenol resins.

The above described polycarbonates (A) and/or polycarbonate copolymers (B) can also be used for the binder-resin in the charge generation layer.

These binder-resins can be used individually or in a combination of two or more kinds thereof with or without mixing them, for example, in a form of a mixture thereof, in the charge generation layer.

The charge transport layer in the electrophotographic photoreceptor of the present invention may be prepared by mixing and binding a charge transporting material with a binder-resin to form into a layer on a base layer. The charge transport layer can be formed by using various techniques, including known ones. For instance, it can preferably be formed by applying a coating liquid obtained by dissolving or suspending a charge transporting material together with a binder-resin in a suitable solvent onto a base layer, followed by drying.

Wherein, at least the above described polycarbonate (A) or polycarbonate copolymer (B) should be used as a binder-resin in the photosensitive layer of the electrophotographic photoreceptor of the present invention. As far as the polycarbonate (A) or polycarbonate copolymer (B) is used as a binder-resin in the photosensitive layer, it is not necessary to use the above described polycarbonate (A) or polycarbonate copolymer (B) as the binder-resin in the charge transport layer of the photosensitive layer in the present invention. However, it is desirable to use the polycarbonate (A) and/or polycarbonate copolymer (B) as a binder-resin in the charge transport layer in the present invention.

The charge transporting material to be used in the charge transport layer can be selected from conventionally used ones, including electron transporting materials and positive hole transporting materials.

Examples of the electron transporting material include electron withdrawing compounds, such as chloranil, bromanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, and 2,4,9-trinitrothioxanthone, and high molecular materials prepared therefrom. These electron transporting materials can be used individually or in a combination of two or more kinds thereof, for examples in a form of a mixture thereof.

Examples of the positive hole transporting material include pyrenes, N-ethylcarbazole, N-isopropylcarbazole,
N-methyl-N-phenylhydrazino-3-methylidene-9-ethylcarbazole,
N,N-diphenylhydrazino-3-methylidene-9-ethylcarbazole,
N,N-diphenylhydrazino-3-methylidene-10-ethylphenothiazine,
N,N-diphenylhydrazino-3-methylidene-10-ethylphenoxazine, hydrazones, such as
p-diethylaminobenzaldehyde-N,N-diphenylhydrazone,
p-diethylaminobenzaldehyde-N-α-naphthyl-N-phenylhydrazone,
p-pyrrolizinobenzaldehyde-N,N-diphenylhydrazone,
1,3,3-trimethylindolenine-ω-aldehyde-N,N-diphenylhydrazone, and
p-dimethylbenzaldehyde-3-methylbenzthiazolinone-2-hydrazone,
2,5-bis(p-diethylaminophenyl)-1,3,4-oxaziazole, pyrazolines, such as
1-phenyl-3-(p-diethylaminostyryl)-5-(p-diethylaminophenyl)pyrazoline,
1-[quinoryl(2)]-3-(p-diethylaminostyryl)-5-(p-diethylaminophenyl)pyrazoline,
1-[lepidyl(2)]-3-(p-diethylaminostyryl)-5-(p-diethylaminophenyl)pyrazoline,
1-[6-methoxy-pyridyl(2)]-3-(p-diethylaminostyryl)-5-(p-diethylaminophenyl)pyrazoline,
1-[pyridyl(5)]-3-(p-diethylaminophenyl)pyrazoline,
1-[pyridyl(2)]-3(p-diethylaminostyryl)-5-(p-diethylaminophenyl)pyrazoline,
1-[pyridyl(2)]-3-(p-diethylaminostyryl)-4-methyl-5-(p-diethylaminophenyl)pyrazoline,
1-[pyridyl(2)]-3-(α-methyl-p-diethylaminostyryl)-4-methyl-5-(p-diethylaminophenyl)pyrazoline,
1-phenyl-3-(p-diethylaminostyryl)-4-methyl-5-(p-diethylaminophenyl)pyrazoline,
1-phenyl-3-(α-benzyl-p-diethylaminostyryl)-5-(p-diethylaminophenyl)pyrazoline, and
spiropyrazoline,
oxazoles, such as
2-(p-diethylaminostyryl)-δ-diethylaminobenzoxazole and
2-(p-diethylaminophenyl)-4-(p-dimethylaminophenyl)-5-(2-chlorophenyl)oxazole,
thiazole compounds, such as
2-(p-diethylaminostyryl)-6-diethylaminobenzthiazole,
triarylmethane derivatives, such as bis(4-diethylamino-2-methylphenyl)phenylmethane,
   (polyaryl)amines, such as
1,1-bis(4-N,N-diethylamino-2-methylphenyl)heptane
   and
1,1,2,2-tetrakis(4-N,N-dimethylamino-2-methyl-
   phenyl)ethane,
benzidine compounds, such as
N,N'-diphenyl-N,N'-bis(methylphenyl)benzidine,
N,N'-diphenyl-N,N'-bis(ethylphenyl)benzidine,
N,N'-diphenyl-N,N'-bis(propylphenyl)benzidine,
N,N'-diphenyl-N,N'-bis(butylphenyl)benzidine,
N,N'-diphenyl-N,N'-bis(isopropylphenyl)benzidine,
N,N'-diphenyl-N,N'-bis(sec-butylphenyl)benzidine,
N,N'-diphenyl-N,N'-bis(tert-butylphenyl)benzidine,
   and
N,N'-diphenyl-N,N'-bis(chlorophenyl)benzidine,
triphenylamine, poly(N-vinyl carbazole), poly(vinylpyrene), poly(vinylanthracene), poly(vinylacridine), poly(9-vinylphenylanthracene), pyrene-formaldehyde resins, and ethylcarbazole-formaldehyde resins.

These materials may be used individually or in a combination of two or more kinds thereof, for examples, in a form of a mixture thereof.

Examples of the solvent which may be used in forming the charge generation layer or the charge transport layer include aromatic solvents, such as benzene, toluene, xylenes, and chlorobenzene, ketones, such as acetone, methyl ethyl ketone and cyclohexanone, alcohols, such as methanol, ethanol, and isopropyl alcohol, esters, such as ethyl acetate and ethyl cellosolves, halogenated hydrocarbons, such as tetrachloromethane, tetrabromomethane, chloroform, dichloromethane, and tetrachloroethane, ethers such as tetrahydrofuran and dioxane, dimethylformamide, dimethyl sulfoxide, diethylformamide, and the like.

These solvents may be used individually or in a form of a mixed solvent in combination of two or more kinds thereof.

In preparation of the electrophotographic photoreceptor of the present invention, the applications of the coating liquids in forming the respective layers may be performed by using a variety of application devices, including known ones. Examples of the application devices which may be used include applicators, spray coaters, bar coaters, dip coaters, roll coaters, and doctor blade.

The following examples are set forth to more fully and clearly illustrate the present invention and are intended to be, and should be construed as being, exemplary and not limitative of the invention.

EXAMPLES 1 TO 9 AND COMPARATIVE EXAMPLES 1

EXAMPLE 1

To a 1-liter flask introduced were a solution obtained by dissolving 95 g (0.25 mol) of 2,2-bis(3-phenyl-4-hydroxyphenyl)propane in 600 ml of 3 N-aqueous solution of potassium hydroxide and 250 ml of methylene chloride, and phosgene was charged into the flask by bubbling it into the resulting mixture at a feed rate of 340 ml/min. for 30 min. while the temperature of the mixture being maintained around 10° C. by cooling from the outside of the flask.

Polymerization was started by adding 0.7 g of p-tert-butylphenol and 2 ml of 0.5 M-aqueous solution of triethylamine, and was continued for 1 hr. with good stirring. After conclusion of the reaction, the organic phase was separated from the resulting reaction mixture and was diluted with 500 ml of methylene chloride. The diluted organic phase was successively washed with water, diluted hydrochloric acid, and water in that order and then was introduced into methanol to obtain an intended polycarbonate. Thus obtained polymer had a reduced viscosity $[\eta_{sp}/C]$ of 0.61 dl/g as measured in methylene chloride at a concentration of of 0.5 g/dl at 20° C., and had a Tg of 145° C. From the result of $^1$H—NMR spectrum analysis, it was confirmed that the polymer is a polycarbonate comprising the following repeating unit.

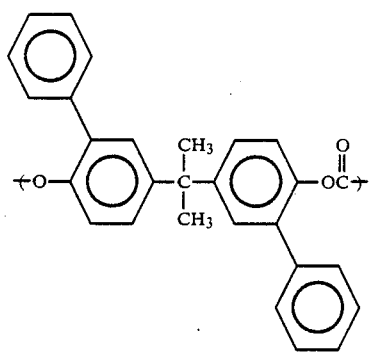

A solution of a mixture comprising 50% by weight of the above prepared polycarbonate and 50% by weight of the hydrazone compound as the charge transporting material represented by the following formula:

hydrazone compound:

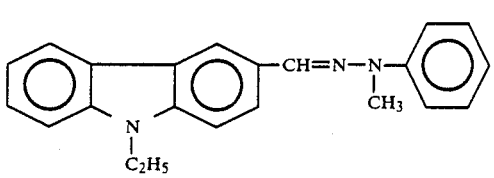

in tetrahydrofuran was prepared, wherein the content of the mixture of the polycarbonate and hydrazon compound in the solution was 10% by weight.

Neither whitening nor gelation of the above prepared solution (coating liquid) occurred and no other problems arouse even when this coating liquid was allowed to stand for ten months.

A laminated-type electrophotographic photoreceptor was prepared by applying the coating liquid by a dip coating method to a charge generation layer containing the dis-azo pigment compound represented by the following formula:

dis-azo compound

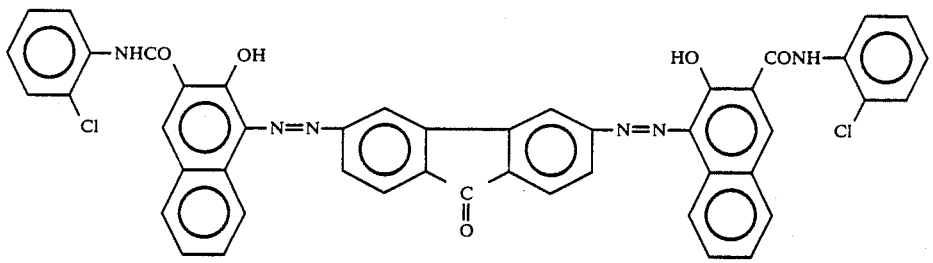

and having a thickness of about 0.5 μm which had been formed on a electroconductive substrate made of aluminum, followed by drying to form a charge transport layer having a thickness of 20 μm on the charge generation layer. No crystallization of the materials of the charge transport layer was found in this application course. In addition, evaluation of the electrophotographic properties of the obtained electrophotographic photoreceptor was conducted by using a static charging testing device produced by Kawaguchi Denki Seisakusho Co., Ltd. After performing a corona electrical charging at −6 kV, the initial surface potential, the residual potential after light irradiation of 10 Lux, the half decay exposure were measured. The results are shown in Table 1. Furthermore, the surface hardness of the charge transport layer was the degree of H (as measured by the pencil hardness test according to JISK-5400).

EXAMPLE 2

The procedure of the preparation of the polymer in Example 1 was exactly repeated, except that 95 g (0.25 mol) of 2,2-bis(3-phenyl-4-hydroxyphenyl)propane was replaced by a mixture of 76 g (0.2 mol) of 2,2-bis(3-phenyl-4-hydroxyphenyl)propane and 11.4 g (0.05 mol) of 2,2-bis(4-hydroxyphenyl)propane. There was obtained a polycarbonate copolymer ([$\eta_{sp}$/C]=0.58 dl/g, Tg=146° C.) comprising the following repeating units:

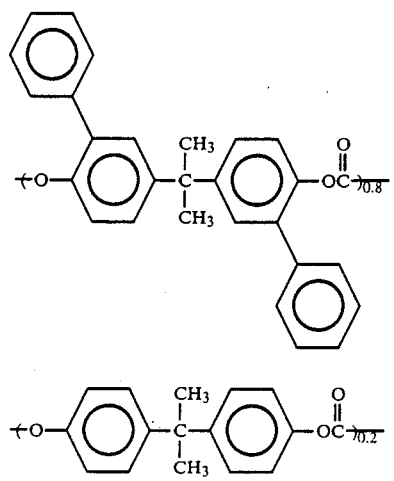

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 3

The procedure of the preparation of the polymer in Example 1 was exactly repeated, except that the 2,2-bis(3-phenyl-4-hydroxyphenyl)propane was replaced by a mixture of 77 g (0.174 mol) of 1-phenyl-1,1-bis(3-phenyl-4-hydroxyphenyl)ethane and 16.5 g (0.076 mol) of bis(4-hydroxyphenyl)sulfone. There was obtained a polycarbonate copolymer ([$\eta_{sp}$/C]=0.53 dl/g, Tg=172° C.) comprising the following repeating units:

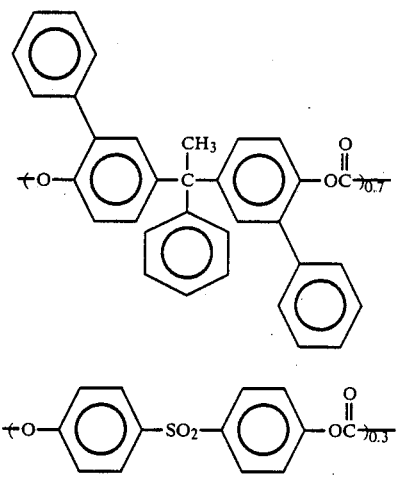

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 4

The procedure of the preparation of the polymer in Example 1 was exactly repeated, except that the 2,2-bis(3-phenyl-4-hydroxyphenyl)propane was replaced by a mixture of 76 g (0.2 mol) of 2,2-bis(3-phenyl-4-hydroxyphenyl)propane and 21.6 g (0.05 mol) of 1,1- bis(3-cyclohexyl-4-hydroxyphenyl)cyclohexane. There was obtained a polycarbonate copolymer ([$\eta_{sp}$/C]=0.59 dl/g, Tg=156° C.) comprising the following repeating units:

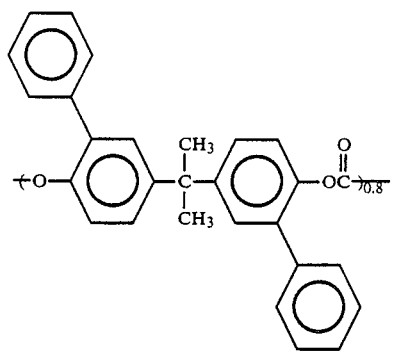
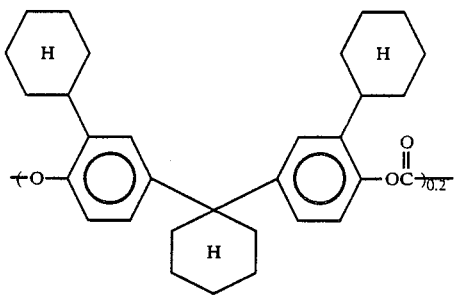

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 5

The procedure of the preparation of the polymer in Example 1 was exactly repeated, except that the 2,2-bis(3-phenyl-4-hydroxyphenyl)propane was replaced by 105 g (0.25 mol) of 1,1-bis(3-phenyl-4-hydroxyphenyl)cyclohexane. There was obtained a polycarbonate ([$\eta_{sp}$/C]=0.59 dl/g, Tg=156° C.) comprising the following repeating unit:

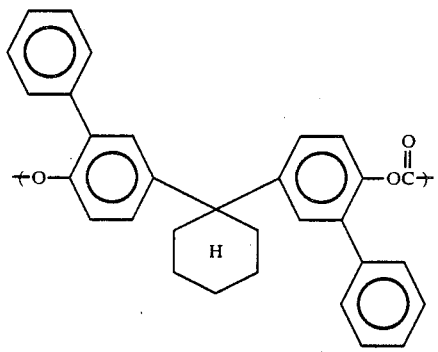

A laminated-type electrophotographic photoreceptor was prepared by the same procedure as described in Example 1, except that the obtained polycarbonate copolymer was replaced by the obove prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 6

The procedure of the preparation of the polymer in Example 1 was exactly repeated, except that the 2,2-bis(3-phenyl-4-hydroxyphenyl)propane was replaced by a mixture of 84 g (0.2 mol) of 1,1-bis(3-phenyl-4-hydroxyphenyl)cyclohexane and 18 g (0.05 mol) of 4,4'-dihydroxytetraphenylmethane. There was obtained a polycarbonate copolymer ([$\eta_{sp}$/C]=0.62 dl/g, Tg=167° C.) comprising the following repeating units:

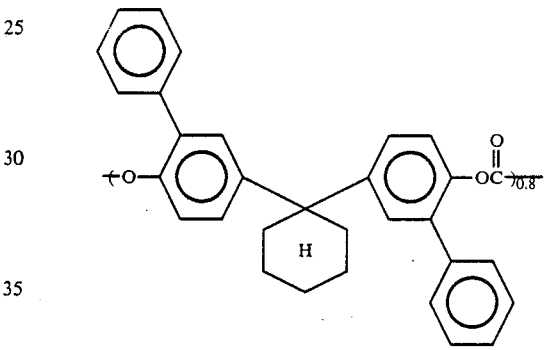
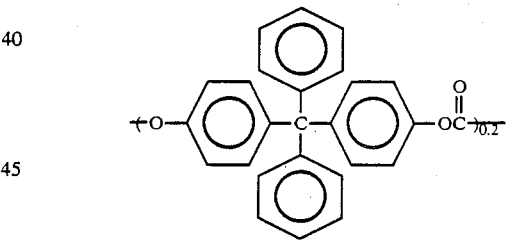

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 7

The procedure of the preparation of the polymer in Example 1 was exactly repeated, except that the 2,2-bis(3-phenyl-4-hydroxyphenyl)propane was replaced by a mixture of 50 g (0.125 mol) of bis(3-phenyl-4-hydroxyphenyl)sulfone and 32 g (0.125 mol) of 2,2-bis(3-methyl-4-hydroxyphenyl)propane. There was obtained a polycarbonate copolymer ([$\eta_{sp}$/C]=0.83 dl/g, Tg=148° C.) comprising the following repeating units:

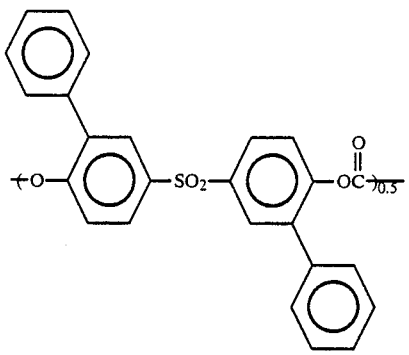

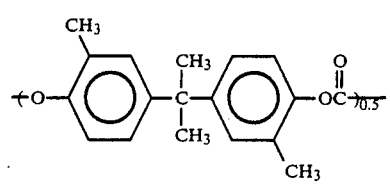

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

EXAMPLE 8

The procedure of the preparation of the polymer in Example 1 was exactly repeated, except that the 2,2-bis(3-phenyl-4-hydroxyphenyl)propane was replaced by a mixture of 32 g (0.076 mol) of 1,1-bis(3-phenyl-4-hydroxyphenyl)cyclohexane and 40 g (0.174 mol) of 2,2-bis(4-hydroxyphenyl)propane. There was obtained a polycarbonate copolymer ([$\eta_{sp}$/C]=1.13 dl/g, Tg=150° C.) comprising the following repeating units:

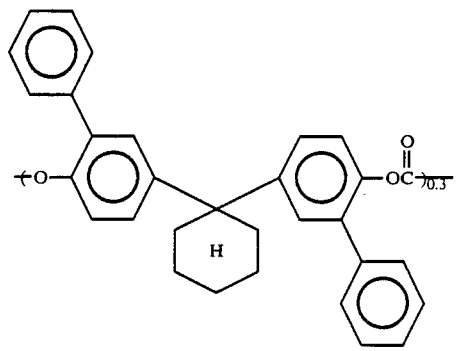

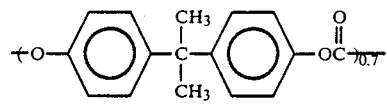

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of the application, and surface hardness were similar to those of Example 1.

EXAMPLE 9

The procedure of the preparation of the polymer in Example 1 was exactly repeated, except that the 2,2-bis(3-phenyl-4-hydroxyphenyl)propane was replaced by a mixture of 4.8 g (0.0125 mol) of 2,2-bis(3-phenyl-4-hydroxyphenyl)propane and 54 g (0.238 mol) of 2,2-bis(4-hydroxyphenyl)propane. There was obtained a polycarbonate copolymer ([$\eta_{sp}$/C]=1.47 dl/g, Tg=148° C.) comprising the following repeating units:

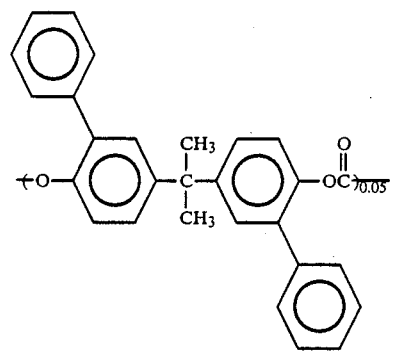

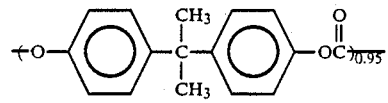

A laminated-type electrophotographic photoreceptor was prepared by the same procedure as described in Example 1, except that the obtained polycarbonate copolymer was replaced by the above prepared polycarbonate copolymer. The electrophotographic properties of the obtained electrophotographic photoreceptor are shown in Table 1. The evaluation results with regard to the stability of the coating liquid, crystallization at the time of application, and surface hardness were similar to those of Example 1.

COMPARATIVE EXAMPLE 1

The procedure of the preparation of the polymer in Example 1 was exactly repeated, except that the 2,2-bis(3-phenyl-4-hydroxyphenyl)propane was replaced by 57 g (0.25 mol) of 2,2-bis(4-hydroxyphenyl)propane There was obtained a polycarbonate ([$\eta_{sp}$/C]=0.62 dl/g, Tg=148° C.) comprising the following repeating unit:

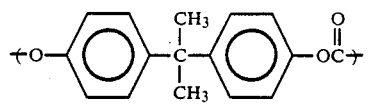

It was tried to prepare a laminated-type electrophotographic photoreceptor by using the same procedure as described in Example 1, except that the polycarbonate used in Example 1 was replaced by the above polycarbonate.

As the result, the prepared coating liquid was whitened with the occurrence of its gelation in two days. In addition, at the time of application of the coating liquid, crystallization (whitening) of some parts of the formed charge transport layer was observed. Furthermore, the surface hardness of the formed charge transport layer was the degree of B in the pencil hardness scale.

TABLE 1

| | Initial surface potential (V) | Residual potential (V) | Half decay exposure (Lux · sec) |
|---|---|---|---|
| Example 1 | −734 | −2 | 0.79 |
| Example 2 | −634 | −4 | 0.68 |
| Example 3 | −650 | −3 | 0.69 |
| Example 4 | −685 | −3 | 0.72 |
| Example 5 | −774 | −2 | 0.80 |
| Example 6 | −750 | −3 | 0.82 |
| Example 7 | −660 | −2 | 0.70 |
| Example 8 | −703 | −3 | 0.73 |
| Example 9 | −764 | −1 | 0.82 |
| Comparative Example 1 | −752 | −3 | 0.84 |

What is claimed is:

1. An electrophotographic photoreceptor comprising an electroconductive substrate and a photosensitive layer disposed on one surface of said electroconductive substrate, wherein said photosensitive layer contains a binder-resin comprising (A) a polycarbonate having the repeating unit represented by the following general formula (I):

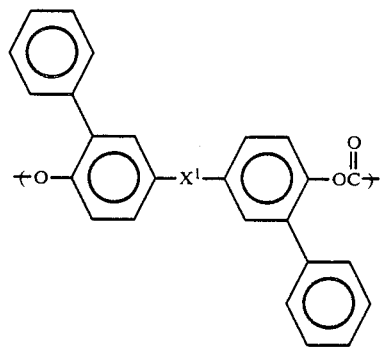

wherein
$X^1$ in the formula (I) is

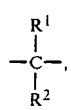

$R^1$ and $R^2$ each independently being hydrogen atom, an alkyl group having a carbon number of 1 to 6 or an aryl group having a carbon number of 6 to 12,

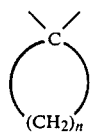

n being an integer of 4 to 10, $-(CH_2)_{\overline{p}}$, p being an integer of 2 to 10, a single bond, —O—, —S—, —SO—, or —SO or (B) a polycarbonate copolymer comprising both the repeating unit represented by the general formula (1) and the repeating unit represented by the following general formula (II):

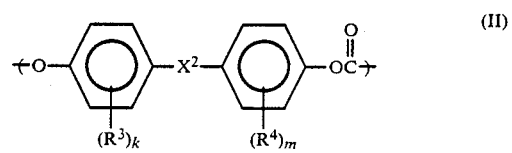

wherein
$R^3$ and $R^4$ in the general formula (II) each are independently a halogen atom, an alkyl group having a carbon number of 1 to 6 or cyclohexyl group;
k and m are each independently an integer of 0 to 4; and
the definition of $X^2$ is the same as the definition of $X^1$ in the general formula (I) as described above, with the proviso that $X^1$ and $X^2$ are identical with or different from each other.

2. The electrophotographic photoreceptor as claimed in claim 1, wherein said photosensitive layer comprises a charge generation layer and a charge transport layer.

3. The electrophotographic photoreceptor as claimed in claim 2, wherein said charge transport layer contains said polycarbonate (A) or said polycarbonate copolymer (B).

4. The electrophotographic photoreceptor as claimed in claim 2, wherein said charge transport layer contains said polycarbonate (A) or said polycarbonate copolymer (B), and said charge generation layer is disposed between said electroconductive substrate and said charge transport layer.

5. The electrophotographic photoreceptor as claimed in claim 1, wherein said photosensitive layer contains a binder resin comprising said polycarbonate (A).

6. The electrophotographic photoreceptor as claimed in claim 5, wherein said polycarbonate (A) has a reduced viscosity [$\eta sp/C$] of not less than 0.25 dl/g as measured in methylene chloride at a concentration of 0.5 g/dl at 20° C.

7. The electrophotographic photoreceptor as claimed in claim 5, wherein said polycarbonate (A) has a repeating unit represented by the following formula:

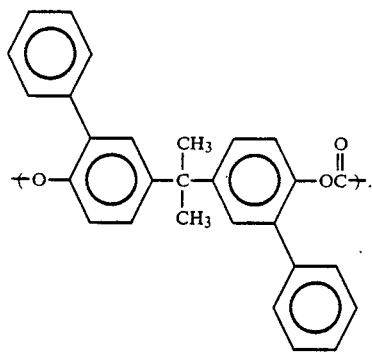

8. The electrophotographic photoreceptor as claimed in claim 5, wherein said polycarbonate (A) has a repeating unit represented by the following formula:

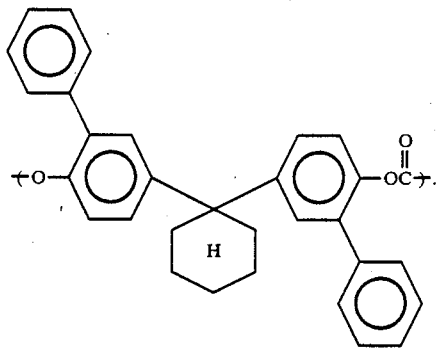

9. The electrophotographic photoreceptor as claimed in claim 1, wherein said photosensitive layer contains a binder resin comprising said polycarbonate copolymer (B).

10. The electrophotographic photoreceptor as claimed in claim 9, wherein said polycarbonate copolymer (B) has a reduced viscosity [$\eta$sp/C] of not less than 0.25 dl/g as measured in methylene chloride at a concentration of 0.5 g/dl at 20° C.

11. The electrophotographic photoreceptor as claimed in claim 9, wherein said polycarbonate copolymer (B) has a mol % of the repeating unit (I) of not less than 1 mol %.

12. The electrophotographic photoreceptor as claimed in claim 9, wherein said polycarbonate copolymer (B) has both the repeating units represented by the following formulas respectively:

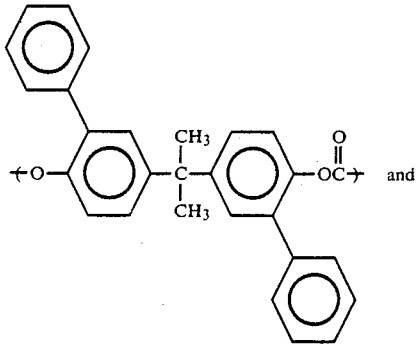

-continued

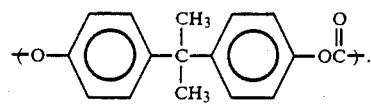

13. The electrophotographic photoreceptor as claimed in claim 9, wherein said polycarbonate copolymer (B) has both the repeating units represented by the following formulas respectively:

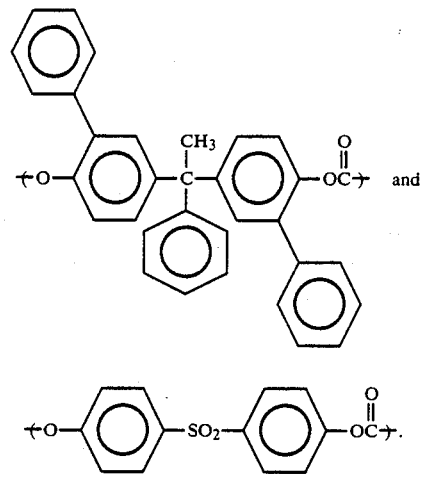

14. The electrophotographic photoreceptor as claimed in claim 9, wherein said polycarbonate copolymer (B) has both the repeating units represented by the following formulas respectively:

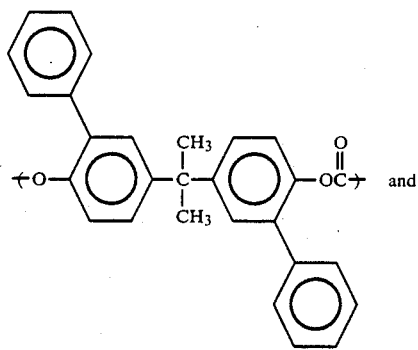

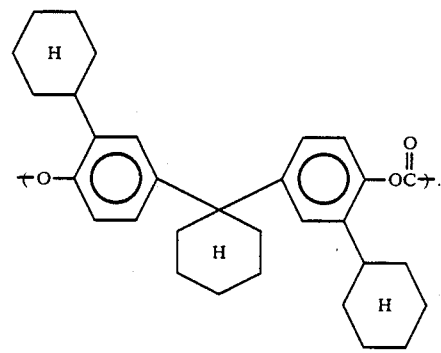

15. The electrophotographic photoreceptor as claimed in claim 9, wherein said polycarbonate copolymer (B) has both the repeating units represented by the following formulas respectively:

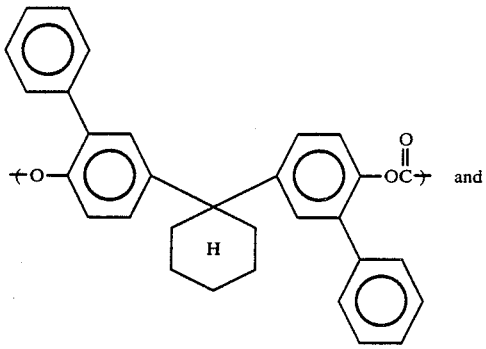

and

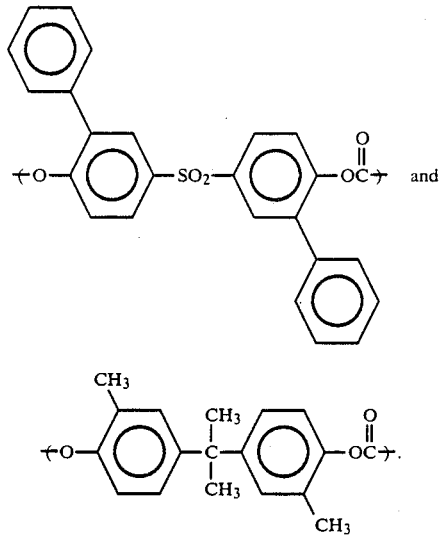

and

16. The electrophotographic photoreceptor as claimed in claim 9, wherein said polycarbonate copolymer (B) has both the repeating units represented by the following formulas respectively:

17. The electrophotographic photoreceptor as claimed in claim 9, wherein said polycarbonate copolymer (B) has both the repeating units represented by the following formulas respectively:

and

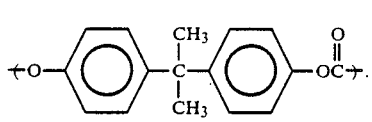

* * * * *